(12) United States Patent
Antony

(10) Patent No.: US 12,480,195 B2
(45) Date of Patent: Nov. 25, 2025

(54) COMPOSITE CORED WIRE CLADDING

(71) Applicant: SCM METAL PRODUCTS, LLC, Research Triangle Park, NC (US)

(72) Inventor: Leo Antony, Cary, NC (US)

(73) Assignee: SCM METAL PRODUCTS, LLC, Research Triangle Park, NC (US)

( * ) Notice: Subject to any disclaimer, the term of this patent is extended or adjusted under 35 U.S.C. 154(b) by 0 days.

(21) Appl. No.: 17/855,061

(22) Filed: Jun. 30, 2022

(65) Prior Publication Data
US 2023/0097681 A1   Mar. 30, 2023

Related U.S. Application Data

(60) Provisional application No. 63/248,885, filed on Sep. 27, 2021.

(51) Int. Cl.
*C23C 4/131* (2016.01)
*B23K 35/02* (2006.01)
*B23K 35/22* (2006.01)
*C23C 4/073* (2016.01)
*C23C 4/10* (2016.01)

(52) U.S. Cl.
CPC .......... *C23C 4/131* (2016.01); *B23K 35/0266* (2013.01); *B23K 35/22* (2013.01); *C23C 4/073* (2016.01); *C23C 4/10* (2013.01)

(58) Field of Classification Search
CPC ............ B23K 35/0272; B23K 35/0244; B23K 35/0261; B23K 35/0255; B23K 35/228; B23K 35/26; B23K 35/24; B23K 35/0266; B23K 35/22
See application file for complete search history.

(56) References Cited

U.S. PATENT DOCUMENTS 4,019,875 A * 4/1977 Dittrich .................. C23C 4/067
                                                          29/DIG. 39
4,741,974 A * 5/1988 Longo ................ B23K 35/0266
                                                           219/146.51
(Continued)

FOREIGN PATENT DOCUMENTS

CA         1276843 C     11/1990
CN         1112278 C      6/2003
(Continued)

OTHER PUBLICATIONS

"International Search Report and Written Opinion of the International Searching Authority", International Application No. PCT/US2022/042750, Feb. 6, 2023, 12 pp.
(Continued)

*Primary Examiner* — Woody A Lee, Jr.
(74) *Attorney, Agent, or Firm* — Myers Bigel, P.A.

(57) ABSTRACT

An innovative cored wire to produce composite claddings containing hard niobium carbide for protection against corrosion, erosion and wear. The cored wire contains an outer wire metallic sheath comprising of metal alloy base, and an innovative core powder mixture. The innovative core powder mixture contains metal alloy or metal, chromium carbide and carbon. During the deposition process, the cored wire melts, and chemically reacts to form metal matrix composite cladding comprising of metal alloy matrix with the newly formed respective metal carbide particles.

32 Claims, 6 Drawing Sheets

(56) References Cited

U.S. PATENT DOCUMENTS

| | | | | |
|---|---|---|---|---|
| 4,810,850 A | * | 3/1989 | Tenkula | C23C 4/06 |
| | | | | 219/146.1 |
| 5,019,454 A | | 5/1991 | Busse | |
| 5,171,968 A | * | 12/1992 | Bates | B23K 35/304 |
| | | | | 219/146.22 |
| 2007/0207186 A1 | * | 9/2007 | Scanlon | B29C 55/26 |
| | | | | 623/1.42 |
| 2008/0098926 A1 | | 5/2008 | Seitz | |
| 2008/0202288 A1 | * | 8/2008 | McKechnie | B01J 2/006 |
| | | | | 75/346 |
| 2013/0092674 A1 | | 4/2013 | Gerth et al. | |
| 2014/0248509 A1 | * | 9/2014 | Cheney | B22F 3/115 |
| | | | | 428/641 |
| 2017/0066086 A1 | * | 3/2017 | Amata | B23K 35/0266 |
| 2017/0130311 A1 | * | 5/2017 | Cheney | C23C 30/00 |
| 2018/0002801 A1 | * | 1/2018 | Carlton | C23C 4/06 |

FOREIGN PATENT DOCUMENTS

| | | | | | |
|---|---|---|---|---|---|
| CN | 102400083 | A | | 4/2012 | |
| CN | 103571996 | A | * | 2/2014 | |
| CN | 104384745 | A | * | 3/2015 | ......... B23K 35/0266 |
| CN | 105364337 | A | * | 3/2016 | |
| CN | 108340091 | A | | 7/2018 | |
| CN | 109967913 | A | | 7/2019 | |
| DE | 8803305 | U1 | | 8/1988 | |
| EP | 0307556 | A2 | | 3/1989 | |
| EP | 0307556 | A3 | | 7/1990 | |
| JP | S6356037 | B2 | * | 11/1988 | |
| KR | 20140070086 | A | * | 6/2014 | |

OTHER PUBLICATIONS

"Invitation to Pay Additional Fees and, Where Applicable, Protest Fee", International Application No. PCT/US2022/042750, Nov. 17, 2022, 2 pp.

"Communication and Supplementary European Search Report", EP Application No. 22873412.5, Jul. 18, 2025, 12 pp.

"Office Action with Examination Search Report", CA Application No. 3,232,560, Feb. 17, 2025, 4 pp.

* cited by examiner

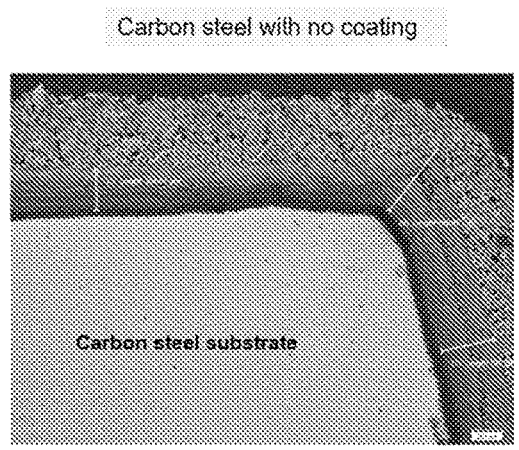
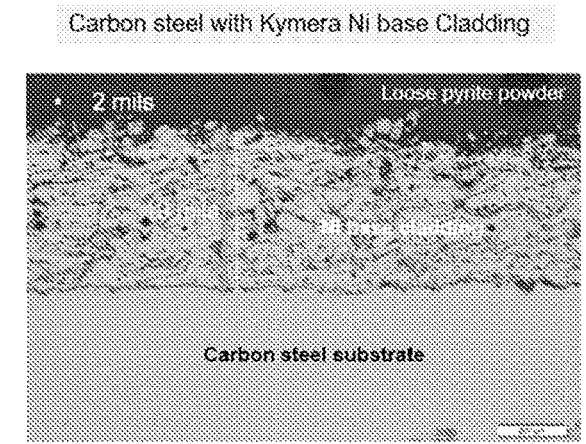
Fig. 4A
Fig. 4B

COMPOSITE CORED WIRE CLADDING

CROSS-REFERENCE TO RELATED APPLICATIONS

The present application claims priority to U.S. Provisional Patent Application Ser. No. 63/248,885 entitled "Composite Cored Wire Cladding," filed Sep. 27, 2021, the entirety of which is hereby incorporated herein by reference.

TECHNICAL FIELD

The present disclosure relates to wire cladding to produce composite coatings. More specifically, the disclosure relates to a cored wire to produce composite coatings for protection against corrosion, erosion, and wear.

BACKGROUND

Thermal spraying techniques are coating techniques in which melted, vaporized, ionized, or otherwise heated are delivered materials in a spray form and applied onto a surface. Thermal spraying may be used to improve or restore the surface of a material. Source materials for thermal spray process include powders, wires and rods of material that are fed into a flame where they are partially or fully melted. Thermal spraying techniques are commonly differentiated based on their heat sources and they are combustion and electric energy. Thermal spray techniques using combustion heat source include processes such as are typically flame spraying, detonation, high velocity oxy fuel (HVOF), and high velocity air fuel (HVAF). Thermal spray techniques using electric heat source include are wire arc, also known as twin wire-arc, and plasma.

Of the several thermal spray coating techniques available, the twin wire-arc spraying technique has many key advantages that are particularly well suited for applications involving multiple numbers of large components. An example of an advantage of twin wire-arc spraying is a faster coatings application rate. In addition, twin wire-arc spray systems are portable; the equipment is robust; and cored wire can be used as feed stock, which offers greater flexibility in the composition of the final coating materials.

There exists a need for a new cored wire with the innovative core powders to form metal matrix composite claddings during the deposition process to provide protection against corrosion, erosion, wear and abrasion problems in power generation, oil and gas, automotive, defense, and aerospace industries. Further, there exists a need to produce ceramic carbides at a relatively lower cost.

SUMMARY

The invention of the present application improves resistance to corrosion, erosion, and wear issues in power generation, oil and gas, defense, and aerospace industries. The invention of the present application also allows the wire arc spraying to produce effective metal matrix composite claddings that enhance the material properties for surface protection.

In one aspect of the invention, a cored wire for wire arc spraying to produce composite claddings on a substrate includes an outer metallic sheath, and an inner core powder disposed within the outer metallic sheath, the inner core powder comprising a mixture of one or more powders comprising a metal and/or master alloy, the master alloy selected from nickel niobium, chromium niobium, aluminum cobalt, chromium aluminum and ferroalloys; chromium carbide; and, carbon. In some embodiments, the total fill of the inner core powder is 15% to 50% by weight. In additional embodiments, the ferroalloys are selected from the group consisting of ferrotitanium, ferroniobium, ferrovanadium, ferrozirconium, ferrotungsten and ferromolybdenum. In further embodiments, the outer sheath comprises nickel base alloy or iron base alloy.

In another aspect, a method of providing a composite cladding on a substrate includes utilizing a wire arc spraying system comprising a positive electrode and a negative electrode. The method also includes feeding fabricated cored wire into the positive electrode a and the negative electrode, the fabricated cored wire comprising, an outer metallic sheath, and an inner core powder disposed within the outer metallic sheath, the inner core powder comprising a mixture of one or more powders comprising a metal or master alloy, the master alloy selected from nickel niobium, chromium niobium, aluminum cobalt, chromium aluminum and ferroalloys; chromium carbide; and, carbon. The method further includes providing an electric power to melt the fabricated cored wire such that the components of the fabricated core wire chemically react to create a composite metal coating. The method includes applying the composite metal coating to the substrate. In some embodiments, the applying step includes a carrier gas. In additional embodiments, the composite coating comprises a metal matrix reinforced with ceramic carbides. In further embodiments, the ceramic carbides are at least one of titanium carbide, niobium carbide, zirconium carbide, vanadium carbide, tungsten carbide and molybdenum carbide.

In yet another aspect, a cored wire for wire arc spraying to produce composite claddings on a substrate includes an outer metallic sheath comprising nickel and/or iron, the outer metallic sheath having a generally cylindrical configuration and a lumen disposed therethrough and an inner core powder disposed within the lumen of the outer metallic sheath, the inner core powder comprising a mixture of one or more powders comprising a metal and/or master alloy, the master alloy selected from nickel niobium, chromium niobium, aluminum cobalt, chromium aluminum, ferrotitanium, ferroniobium, ferrovanadium, ferrozirconium, ferrotungsten and ferromolybdenum; chromium carbide; carbon; and, a metal oxide, wherein the total fill of the inner core powder is 15% to 50% by weight.

DRAWINGS

In order that the present disclosure may be well understood, there will now be described various forms thereof, given by way of example, reference being made to the accompanying drawings. The components in the figures are not necessarily to scale.

Moreover, in the figures, like-referenced numerals designate corresponding parts throughout the different views.

FIGS. 4A and 4B depict performance of embodiments of the present invention during sulfidation testing.

Figure 1:
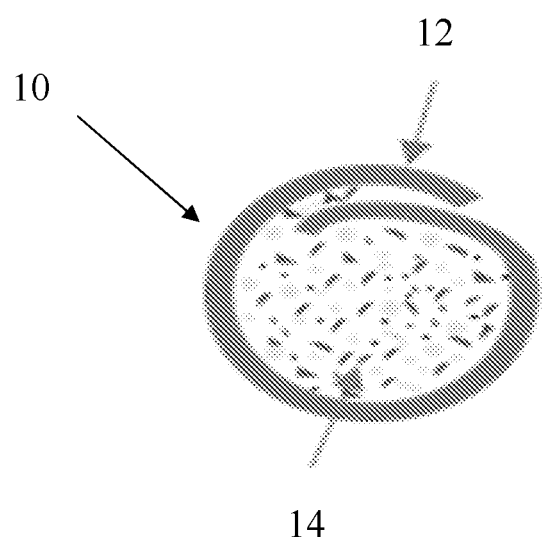
FIG. 1 depicts a cross-section of an embodiment of a core wire for use in a twin-wire arc thermal spraying technology.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The term "metal" refers to an electropositive chemical element. The term "element" in this Specification refers generally to an element that can be found in a Periodic Table. Physically, a metal atom in the ground state contains a partially filled band with an empty state close to an occupied state.

The term "alloy" refers to a homogeneous mixture or solid solution of two or more metals, the atoms of one replacing or occupying interstitial positions between the atoms of the other, for example, brass is an alloy of zinc and copper. An alloy, as opposed to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases.

Wire arc spraying provides a relatively rapid and cost-effective means for applying a layer of material to an existing substrate. For example, wire arc spraying can be used to apply a relatively thick layer of metal or metal/ceramic material to a substrate. Thermal spraying, particularly the twin wire-arc thermal spray technology, has been widely used and successfully demonstrated for coatings applications (in-situ and shop) on large components, such as waterwall/furnace wall panels in coal-fired, pulp and recovery, biomass and waste to energy boilers, petrochemical vessels such as acid gas scrubbers, amine regenerators, H2S absorbers and distillation columns, wind turbine applications, cement industries and hydro power applications. Thermal spraying, particularly the twin wire-arc thermal spray technology, has been widely used and successfully demonstrated for coatings applications on large components. Examples of components that have utilized twin wire-arc thermal spray technology for coating applications include waterwall/furnace wall panels in coal-fired, pulp and recovery, biomass and waste to energy boilers, petrochemical vessels such as acid gas scrubbers, amine regenerators, H2S absorbers and distillation columns, wind turbine applications, cement industries and hydro power applications.

The principal objective of this invention is to form a composite metal matrix cladding on the substrate preferably a metallic substrate using the twin wire arc technology. The invention of the present application provides a cored wire feedstock designed to obtain composite claddings that contain intermetallic, metal and metal carbide through a reactive arc spraying. An aspect of the invention comprises of a specially designed cored wire. The cored wire contains an outer metallic sheath and an innovative inner core powder mixture. Another aspect of the invention comprises a method of producing a method of providing a composite cladding on a substrate comprising using an embodiment of the cored wire.

FIG. 1 depicts cross section of an embodiment of a cored wire 10. As shown, the cored wire 10 includes an outer sheath material 12 and an inner powder material 14. The outer sheath, in some embodiments, may be wrapped into a generally cylindrical configuration in order to create an interior lumen. The cored wire 10 may be manufactured by conventional techniques where in the inner core powder 14 is encapsulated by the outer sheath material 12.

The outer sheath material 12 may be manufactured from alloys known to one of ordinary skill in the art. In some embodiments, the outer sheath material may comprise a nickel base alloy or an iron base alloy. In embodiments where the outer sheath material 12 is a nickel base alloy, the nickel base alloy may further include additional elements including, but not limited to, chromium, silicon, manganese, and iron. In a particular embodiment, the outer sheath material 12 may comprise an alloy of nickel and chromium. In embodiments where the outer sheath material 12 is an iron base alloy, the nickel base alloy may further include additional elements including, but not limited to, chromium, silicon, manganese, and nickel. In alternative embodiments, the outer sheath may comprise an alloy that comprises elements including, but not limited, aluminum, chromium, cobalt, molybdenum, titanium, silicon, copper, tantalum, niobium and also combinations thereof. The thickness of the outer metallic sheath material 12 may range from 0.0625 in. to 0.125 in. In some embodiments, the core wire 10 may be used in a twin-wire arc thermal spraying system. As will be discussed later in the application, the melting and alloying due to the chemical reaction between both the sheath and the powder material in an arc results in the desired composite material. In alternative embodiments, the core wire 10 may be used in laser and welding processes.

The inner core powder 14 may comprise a mixture of materials including master alloys or metal, chromium carbide, and carbon. The mixture of the inner core powder 14 are mixed to provide an ideal stoichiometry. In embodiments where the mixture of the inner core powder 14 comprises a master alloy, the master alloy may be selected from the group including, but not limited to, nickel niobium, chromium niobium, aluminum cobalt, chromium aluminum and ferroalloys. Examples of ferroalloys that may be used with the inner core powder 14 include ferroniobium, ferrovanadium, ferrozirconium, ferrotungsten, and ferromolybdenum. In embodiments where the mixture of the inner core powder 14 comprises a metal, the metal may be selected from the group including, but not limited to, titanium, niobium, vanadium, zirconium, tungsten and molybdenum. The inner core powder 14 may further include a metal oxide. The metal oxide may be selected from the titanium oxide, niobium oxide, vanadium oxide, zirconium oxide, tungsten oxide, molybdenum oxide and chromium oxide.

In some embodiments, the mixture of the inner core powder material fill may range from 15% to 50% by weight. In some embodiments, the weight proportions of the inner core powder mixture containing master alloys and/or metal is about 35% to about 80% by weight, chromium carbide is about 5% to about 45% by weight; and carbon is about 1% to about 10% by weight. The size of the core powder may range from 50 nanometers to 250 micrometers.

Figure 2:
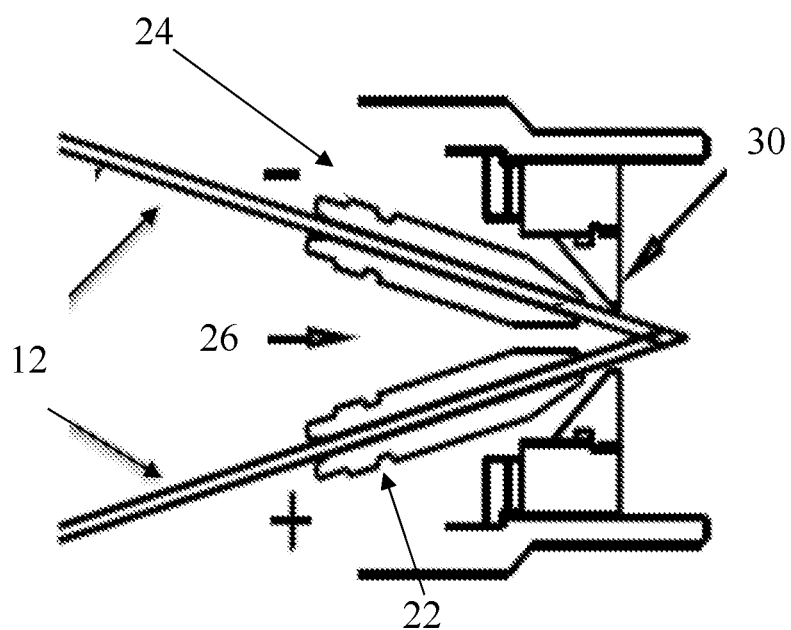
FIG. 2 depicts a schematic of a twin-wire arc thermal spraying technology.

FIG. 2 a schematic of a twin-wire arc thermal spraying apparatus 20, such as a spray gun. As shown, the wire arc spraying apparatus 20 includes two electrodes 22, 24 or contact tips. Electrode 22 carries a positive charge while electrode 24 carries a negative charge. A first core wire 10 is fed through electrode 22 and a second core wire is fed through electrode 24. When these wires make contact, they create an arc and the heat of which then melts the wires. Since the wires become molten due to the electric arc, the efficiencies of the process are considerably greater than those of other thermal spray processes.

The twin-wire arc thermal apparatus 20 also includes a carrier gas stream 26 and an air cap 28. The carrier gas stream 26 provides a flow of carrier gas to engage with the molten wire particles. The velocity of the carrier gas stream 26 may range from 10 to 90 SCFM. The carrier gas in the carrier gas stream 26 may comprise air, argon, nitrogen, or any other suitable gas. The air cap 28 may be placed on an end opposite of where the wires are fed into the apparatus 20. The air cap 28 directs the flow pattern of the carrier gas stream 26 for the atomization of melted core wire 12. In use, the carrier gas stream 26 blows the molten metal during a disposition process through the air cap 28 and towards the target. During this process, the molten metal of the core wire 12 is atomized into droplets, and the droplets are deposited on a target substrate as a coating or cladding. The physical effects associated with the atomizing gas are twofold; namely, 1) the production of finer molten particles and 2) the acceleration of the produced particles toward a substrate being coated. The resultant claddings contain nickel-chromium or iron-chromium metal matrix with niobium carbide or titanium carbide or zirconium carbide or vanadium carbide or tungsten carbide or molybdenum carbide reinforcements. The target substrate may be metal, such as iron, nickel, or cobalt, or a metal-based alloy.

The melting of the core wires 12 creates a chemical reaction in order to form ideal metal matrix composite coatings during the spray deposition process on the substrate. While not bound by theory, during the twin-wire arc process, the chromium carbide in the inner core powder 14 dissociates and gives extra chromium to the resultant coatings from the spray deposition process. The extra chromium coming from the chromium carbide dissociation boosts the corrosion performance of the resultant coatings. The carbon from chromium carbide dissociation and the added carbon reacts with the metal or master alloy in the inner core material 14 to form thermodynamically preferred or stable carbides. Examples of thermodynamically preferred or stable carbides include niobium carbide, titanium carbide, zirconium carbide, vanadium carbide, tungsten carbide and molybdenum carbide during the deposition process. The presence of carbon in the mixture also maintains a reducing environment during the spray deposition process. Thus, during the spray disposition process, the resultant coating or cladding comprises iron-chromium-manganese reinforced with ceramic carbides. Advantageously, this is created all in one step by the reaction of the novel core wire during the twin-arc process. The amount of ceramic carbides in the metal matrix present in the resultant coating may range from about 10% to about 50% by weight. The thickness of the resultant coating may range from 75 micrometers to 2500 micrometers.

Figure 3A:
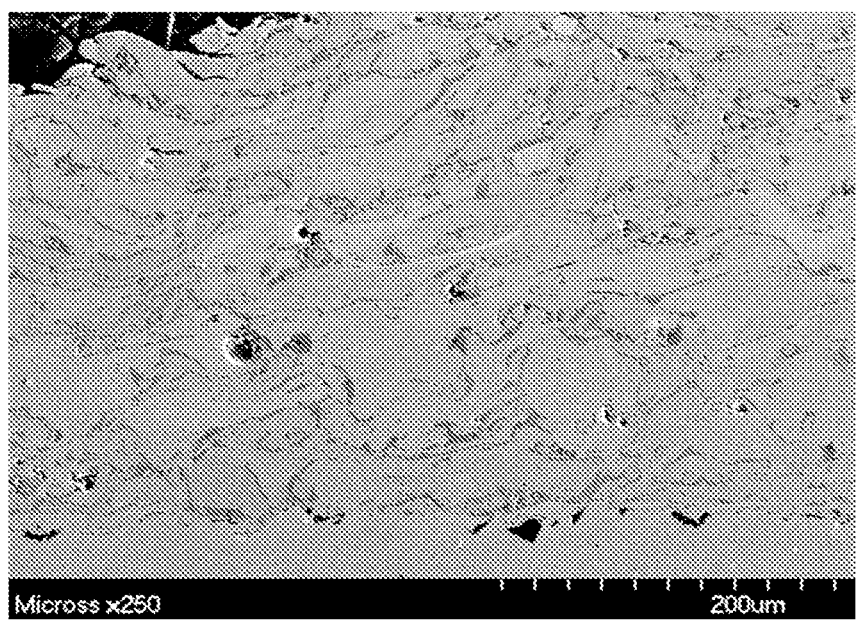
FIG. 3A depicts a SEM micrograft of an embodiment of a composite coating created by using an embodiment of the present invention applied to a substrate.
Figure 3B:
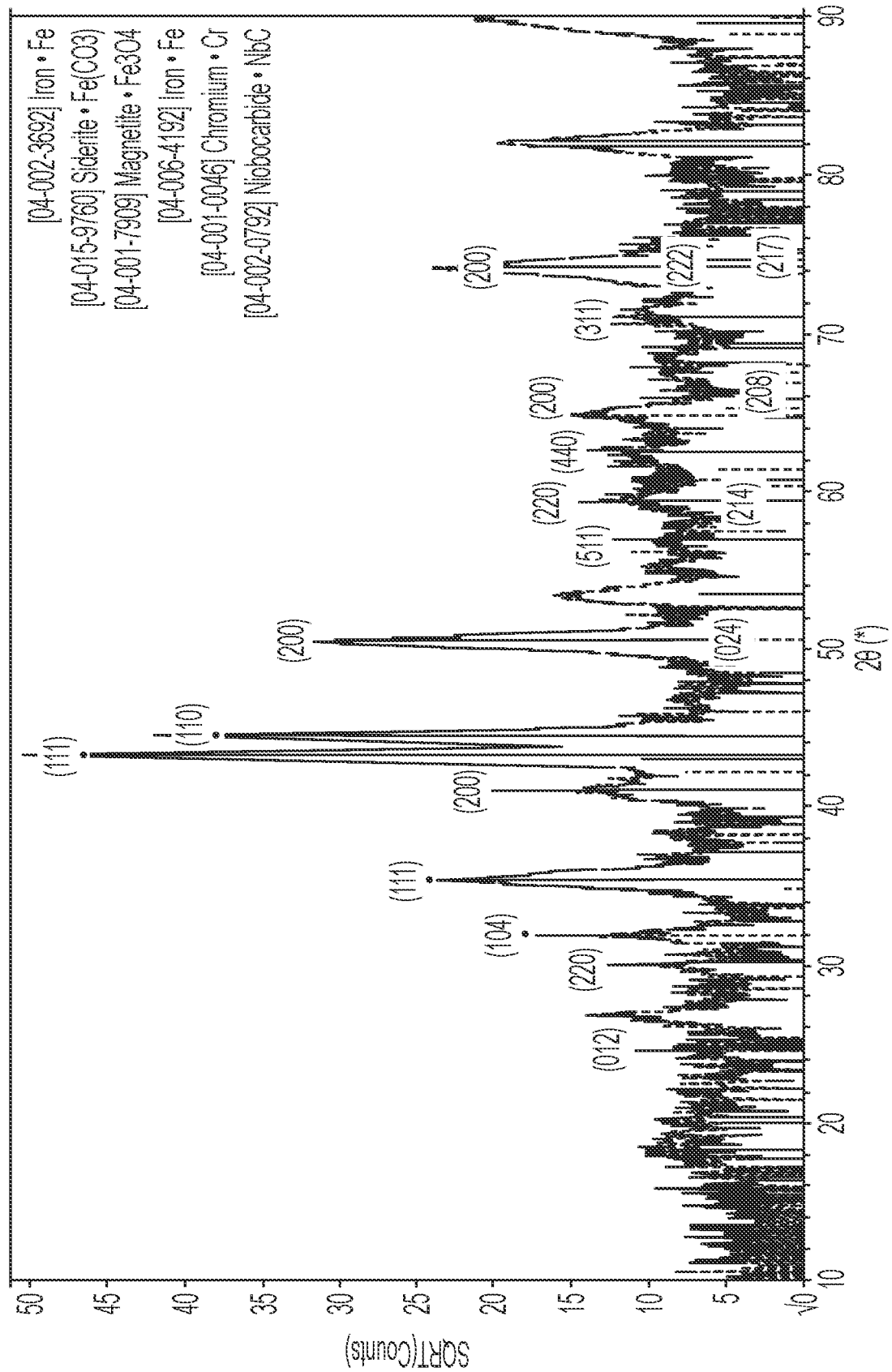
FIG. 3B depicts an XRD analysis of the embodiment of FIG. 3B.

FIG. 3A depicts a SEM micrograph of an embodiment of a substrate 30 that has been applied with an embodiment of the composite cladding 32 comprising niobium carbide. FIG. 3B depicts an XRD analysis of the substrate 30 and the composite cladding 32 demonstrating the presence of niobium carbide. The substrate 30 comprising the composite cladding 32 WAS not polished and thus, other substances, such as iron carbonate and iron oxide, were detected due to surface contamination.

An advantage of the invention is that it allows the wire arc spraying to produce effective metal matrix composite claddings that enhances its material properties for surface protection. Furthermore, it provides a cost-effective solution to form and reinforce superior ceramic carbides in the metal matrix claddings. This cladding mitigates surface degradation mechanisms such as corrosion, wear and erosion.

Examples

Representative Embodiments of Cladding

By way of examples, embodiments of a coating or cladding material comprising niobium carbide produced from an embodiment of a core wire produced using a twin-arc wire thermal spraying process. The representative embodiments of the cladding material have the following general metallurgical characteristics:

TABLE 1

General metallurgical characteristics of the cladding

| Characteristics | Values |
| --- | --- |
| Porosity | <4% |
| Cohesive Bond Strength | ~4400 psi |
| Hardness | 584 ± 98 HV0.1 |

Sulfidation Testing

FIGS. 4A and 4B depict the performance of an embodiment of a nickel-based niobium carbide cladding produced from an embodiment of the core wire in sulfidation testing. Good corrosion resistance is the most fundamental requirement for any applied coating/cladding material used in a boiler environment. When selecting a suitable material, it is important to understand all the possible corrosive environments and the associated mechanism of attack. Furthermore, both local and general forms of corrosion attack should be considered, since either can compromise the underlying tube. The corrosion resistance was evaluated by exposing bare carbon steel and carbon steel comprising an embodiment of the cladding to a powder mixture of pyrite and iron sulfide at a temperature of about 537° C. (+/−5° C.), for 21 days. One of skill in the art will understand that pyrite produces an aggressive form of sulfidation attack that may be present, for example, along waterwalls of coal-fired boilers.

FIG. 4A depicts bare carbon steel with no cladding. As shown in the micrograph, there is significant sulfidation attack. Specifically, 23 mils of corrosion were measured from the substrate. By contrast, FIG. 4B depicts carbon steel with the embodiment of the nickel based cladding created from an embodiment of a core wire. As shown in the micrograph, the maximum sulfidation attack on the outer surface is 2 mils and no corrosion is visible on the substrate. Accordingly, the performance of the carbon steel substrate with the embodiment of the nickel-based cladding created from an embodiment of a core wire of FIG. 4B is about 12 times greater than the bare carbon steel substrate of FIG. 4A.

Erosion Testing

Figure 5:
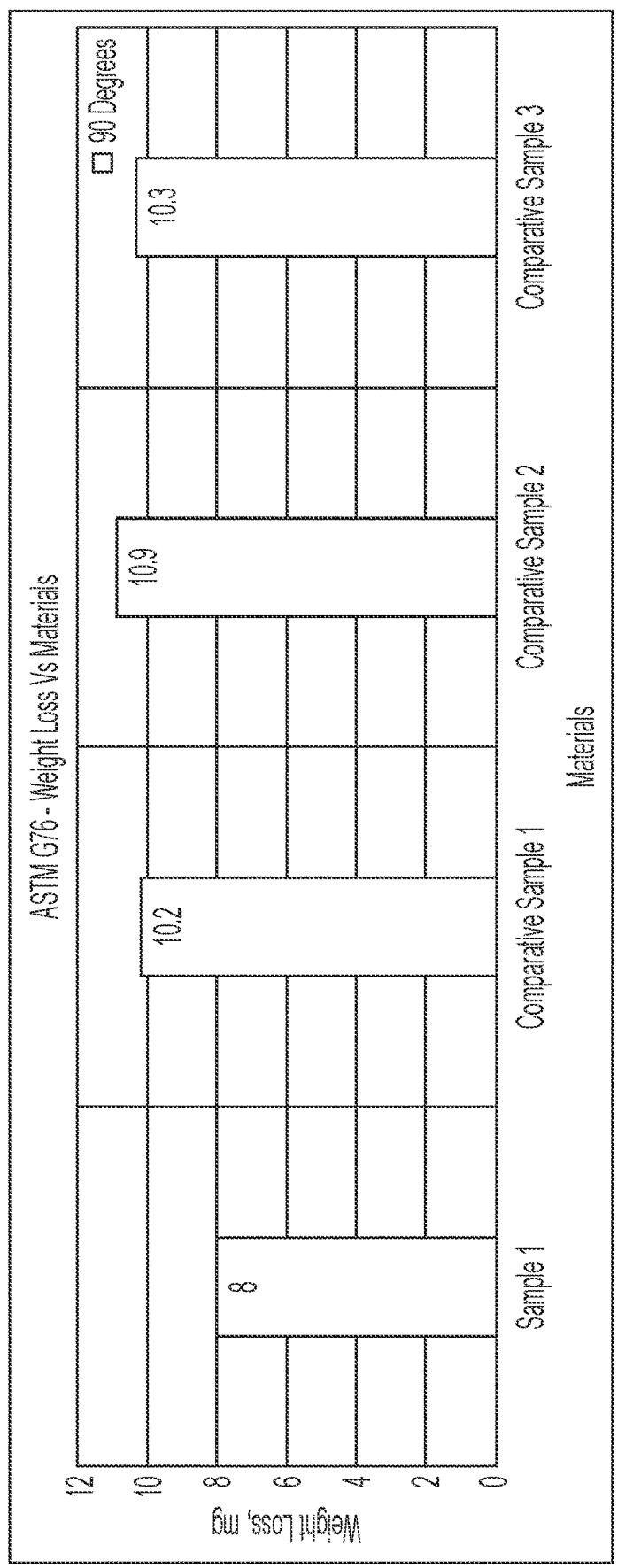
FIG. 5 depicts performance of embodiments of the present invention during erosion testing.

FIG. 5 depicts performance of an embodiment of an iron-based niobium carbide cladding produced from an embodiment of the core wire during erosion testing. The distance tested was 10 mm. The samples were tested at 15 and 90 degrees at a velocity of 30 m/s. A pressure of 8 psi was applied to the samples. The samples were alumnia having an angular shape and 50 μm diameter. If the composite cladding performance is better than the common competitor products at 90-degree impingement, then the material is successfully validated for its erosion performance. The testing was performed according to American Society for Testing and Materials ("ASTM") G76.

Sample 1 included iron-based niobium carbide cladding according to the invention. Comparative samples 2 and 3 comprise a nickel-based. Comparative samples 1-3 were claddings that were not in accordance with the present invention. Comparative sample 1 comprises an iron-based cladding. As shown, sample 1, with the iron-based coating according to the invention performed the best among all the coated samples at 90 degrees impingement.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A cored wire for wire arc spraying to produce composite claddings on a substrate, comprising:
    an outer metallic sheath; and
    an inner core powder disposed within the outer metallic sheath, the inner core powder comprising a mixture of:
        one or more powders comprising a metal and/or master alloy, the master alloy selected from nickel niobium, chromium niobium, aluminum cobalt, chromium aluminum and ferroalloys;
        chromium carbide; and
        carbon,
    wherein, upon application of electric power to melt the cored wire, the outer metallic sheath and the inner core powder disposed within the outer metallic sheath are configured to chemically react to create a composite metal coating on the substrate.

2. The cored wire of claim 1, wherein the total fill of the inner core powder is 15% to 50% by weight.

3. The cored wire of claim 1, wherein the mixture of the inner core powder comprises:
    35% to 80% by weight of one or more one or more alloys selected from nickel niobium, chromium niobium, aluminum cobalt, chromium aluminum, and ferroalloys;
    5% to 45% by weight of chromium carbide; and
    1% to 10% by weight of carbon powders.

4. The cored wire of claim 1, wherein the inner core powder further comprises a metal oxide.

5. The cored wire of claim 4, wherein the metal oxide is selected from the group consisting of titanium oxide, niobium oxide, vanadium oxide, zirconium oxide, tungsten oxide, molybdenum oxide and chromium oxide.

6. The cored wire of claim 1, wherein the outer sheath comprises nickel base alloy, iron base alloy, or aluminum base alloy.

7. The cored wire of claim 6, wherein the iron base alloy further includes chromium, silicon, manganese, and nickel.

8. The cored wire of claim 6, wherein the nickel base alloy further includes chromium, silicon, manganese, and iron.

9. The cored wire of claim 1, wherein the outer metallic sheath is selected from the group consisting of aluminum, chromium, cobalt, molybdenum, titanium, silicon, copper, tantalum, niobium, and combinations thereof.

10. The cored wire of claim 1, wherein the outer metallic sheath has a thickness from 0.0625 in. and 0.125 in.

11. The core wire of claim 1, wherein the size of the inner core powders is 50 nm to 250 µm.

12. The cored wire of claim 1, wherein the outer metallic sheath has a thickness from 0.0625 in. and 0.125 in.

13. The cored wire of claim 1, wherein the ferroalloys are selected from the group consisting of ferrotitanium, ferroniobium, ferrovanadium, ferrozirconium, ferrotungsten and ferromolybdenum.

14. A method of providing a composite cladding on a substrate, comprising:
    utilizing a wire arc spraying system comprising a positive electrode and a negative electrode;
    feeding fabricated cored wire into the positive electrode and the negative electrode, the fabricated cored wire comprising:
        an outer metallic sheath; and
        an inner core powder disposed within the outer metallic sheath, the inner core powder comprising a mixture of:
            one or more powders comprising a metal or master alloy, the master alloy selected from the group consisting of nickel niobium, chromium niobium, aluminum cobalt, chromium aluminum and ferroalloys;
            chromium carbide; and
            carbon;
    providing an electric power to melt the fabricated cored wire such that the components of the fabricated core wire chemically react to create a composite metal coating; and
    applying the composite metal coating to the substrate.

15. The method of claim 14, wherein the applying step includes a carrier gas.

16. The method of claim 15, wherein the carrier gas is air, argon, or nitrogen.

17. The method of claim 14, wherein composite coating thickness ranges from 75 μm to 2500 μm.

18. The method of claim 14, wherein the composite coating comprises a metal matrix reinforced with ceramic carbides.

19. The method of claim 18, wherein the ceramic carbide comprises niobium carbide.

20. The method of claim 19, wherein the amount niobium carbide presented in the composite coating ranges from 10% to about 50% by weight.

21. The method of claim 18, wherein the ceramic carbides are at least one of titanium carbide, niobium carbide, zirconium carbide, vanadium carbide, tungsten carbide and molybdenum carbide.

22. The method of claim 14, wherein the total fill of the inner core powder is 15% to 50% by weight.

23. The method of claim 14, wherein the inner core powder comprises:
    35% to 80% by weight of ferroalloys or one or more one or more alloys selected from the group consisting of nickel niobium, chromium niobium, aluminum cobalt, chromium aluminum;
    5% to 45% by weight of chromium carbide; and
    1% to 10% by weight of carbon powders.

24. The method of claim 14, wherein the core powder further comprises metal oxide.

25. The method of claim 24, wherein the metal oxide is selected from the group consisting of titanium oxide, niobium oxide, vanadium oxide, zirconium oxide, tungsten oxide, molybdenum oxide and chromium oxide.

26. The method of claim 14, wherein the outer sheath comprises nickel base alloy, iron base alloy, or aluminum base alloy.

27. The method of claim 26, wherein the iron base alloy further includes chromium, silicon, manganese, and nickel.

28. The method of claim 26, wherein the nickel base alloy further includes chromium, silicon, manganese, and iron.

29. The method of claim 14, wherein the outer metallic sheath is selected from the group consisting of aluminum, chromium, cobalt, molybdenum, titanium, silicon, copper, tantalum, niobium, and a combination thereof.

30. The method of claim 14, wherein the ferroalloys are selected from the group consisting of ferrotitanium, ferroniobium, ferrovanadium, ferrozirconium, ferrotungsten and ferromolybdenum.

31. A cored wire for wire arc spraying to produce composite claddings on a substrate, comprising:
    an outer metallic sheath comprising nickel and/or iron, the outer metallic sheath having a generally cylindrical configuration and a lumen disposed therethrough; and
    an inner core powder disposed within the lumen of the outer metallic sheath, the inner core powder comprising a mixture of:
        one or more powders comprising a metal and/or master alloy, the master alloy selected from nickel niobium, chromium niobium, aluminum cobalt, chromium aluminum, ferrotitanium, ferroniobium, ferrovanadium, ferrozirconium, ferrotungsten and ferromolybdenum;
        chromium carbide;
        carbon; and
        a metal oxide,
    wherein the total fill of the inner core powder is 15% to 50% by weight, and
    wherein, upon application of electric power to melt the cored wire, the outer metallic sheath and the inner core powder disposed within the outer metallic sheath are configured to chemically react to create a composite metal coating on the substrate.

32. A cored wire for wire arc spraying to produce composite claddings on a substrate, comprising:
    an outer metallic sheath; and
    an inner core powder disposed within the outer metallic sheath, the inner core powder consisting of a mixture of:
        chromium carbide;
        carbon; and
        one or more powders comprising a master alloy selected from the group consisting of nickel niobium, chromium niobium, and ferroalloys,
    wherein, upon application of electric power to melt the cored wire, the outer metallic sheath and the inner core powder disposed within the outer metallic sheath are configured to chemically react to create a composite metal coating on the substrate.

* * * * *